United States Patent [19]

Cornette et al.

[11] Patent Number: 4,818,773

[45] Date of Patent: Apr. 4, 1989

[54] ALKYLAMINOPHOSPHONIC CHELATING RESINS, THEIR PREPARATION AND USE IN PURIFYING BRINES

[75] Inventors: Michel A. G. Cornette; Jack Carbonel; Jacques E. A. Franc; Paul D. A. Grammont, all of Chauny, France

[73] Assignee: Rohm and Haas Company, Philadelphia, Pa.

[21] Appl. No.: 671,720

[22] Filed: Nov. 15, 1984

Related U.S. Application Data

[63] Continuation of Ser. No. 469,437, Feb. 24, 1983, abandoned.

[51] Int. Cl.$^4$ ............................................. C08D 5/20
[52] U.S. Cl. ........................................ 521/32; 521/31
[58] Field of Search .............................. 521/31, 25, 32

[56] References Cited

U.S. PATENT DOCUMENTS

| | | | |
|---|---|---|---|
| 4,002,564 | 1/1977 | Carbonel et al. | 210/38 R |
| 4,176,022 | 11/1979 | Parlington | 204/98 |
| 4,442,231 | 4/1984 | Kataopa et al. | 521/31 |

FOREIGN PATENT DOCUMENTS

385977  9/1973  U.S.S.R. .............................. 521/31

OTHER PUBLICATIONS

Polymer Science U.S.S.R. vol. 15, No. 6, 1974, Davankov et al., pp. 1349–1362.
Chem. Abstract vol. 80, 1974, entry 83990.

*Primary Examiner*—Joseph L. Schofer
*Assistant Examiner*—Peter F. Kulkosky
*Attorney, Agent, or Firm*—John E. Taylor, III

[57] ABSTRACT

New macroporous alkylaminophosphonic chelating resins which exhibit excellent mechanical stability and strength and good chemical stability are characterized by having an apparent density of 0.35 to 0.425 g/ml, a granulometry smaller than 0.8 mm, a water retention of 50 to 60 percent in the acid form, a porosity of 800 to 1100 mm$^3$g, a total theoretical capacity for the fixation of calcium ions of not greater than 31 g/l of resin in the sodium form and an osmotic resistance such that more than 90 percent of the beads are intact after 30 shocks. The high resistance to osmotic shock combined with an adequate exchange capacity exhibited by the new resins makes them particularly suitable for use in highly concentrated solutions, such as concentrated electrolytic brines.

A simple, effective, and economical procedure is described which makes it possible to eliminate, in the form of complexed cations, the impurities contained in the brines used for the electrolytic production of chlorine or alkali metals in membrane cells or diaphragm cells and for the electrolytic production of chlorates.

24 Claims, No Drawings

ALKYLAMINOPHOSPHONIC CHELATING RESINS, THEIR PREPARATION AND USE IN PURIFYING BRINES

This application is a continuation of application Ser. No. 469,437 filed Feb. 24, 1983 and now abandoned.

FIELD OF THE INVENTION

The present invention pertains to a process for the manufacture of macroporous chelating resins of the alkylaminophosphonic type which have special properties, particularly high resistance to osmotic shock combined with an adequate exchange capacity, as well as the resins thereby obtained and a process for the purification of solutions of high osmotic strength such as the concentrated brines used for the electrolytic production of chlorine and chlorates, using the resins.

BACKGROUND OF THE INVENTION

The majority of the known ion-exchange resins, particularly the alkylaminophosphonic resins with a styrene-divinylbenzene matrix, exhibit limited resistance to the successive swellings and contractions that occur during their passage from the regenerated form to the saturated form, and vice versa. The high percentage of cracked and broken beads which thus occurs in such resins during service severely limits their use, notably in very concentrated solutions which require a high mechanical resistance to osmotic shock. For this reason, their industrial application in such cases is unsatisfactory and sometimes even prohibitive.

French Patent Application No. 74.25610 as well as U.S. Pat. No. 4,002,564, the disclosure of which is hereby incorporated by reference, have as their subject alkylaminophosphonic chelating resins of the same type as the resin which is the subject of the present invention. However, the known resins do not exhibit a sufficiently high osmotic shock resistance at the same time as an adequate exchange capacity, so as to permit their economic use for the separation of metallic cations from very concentrated solutions. The chelating resin which is the subject of the present invention exhibits properties which are clearly superior to the known aminoalkylphosphonic resins, notably a greatly improved resistance to osmotic shock during use in highly concentrated solutions.

The procedure which is the subject of the present invention makes it possible to produce this resin, the improved properties of which are obtained thanks to its manufacture under strictly controlled, specific conditions, on the basis of a reticulated vinylaromatic matrix with predetermined characteristics.

The present invention further includes the use of the improved resin in the purification of solutions of high osmotic strength, notably the concentrated brines which are used in the electrolytic production of chlorine, chlorates and alkali metal hydroxides. All three of the present industrial procedures used for the manufacture of chlorine by means of the electrolysis of concentrated alkali metal chloride brines require suitable monitoring of the amounts of calcium and magnesium which are present as impurities in these brine solutions. The calcium concentration is generally reduced to about 10 mg/l for mercury cells and to about 3 to 5 mg/l for effective operation of diaphragm cells. The calcium concentration must however be reduced to less than 0.05 mg/l, preferably as low as 0.02 mg/l, for the effective operation of membrane cells. Furthermore, for membrane cells, the magnesium concentration should preferably be reduced to less than 0.005 mg/l. An excess of calcium and magnesium above the indicated limits reduces not only the performance but also the life-span of the membranes. High purity brines are similarly required in the electrolytic production of chlorates.

The amount of calcium in the brines can be reduced to 2 to 10 mg/l by suitable chemical pretreatments involving decanting and filtration. Greater reduction in the calcium level can only be practically and economically realized by the use of ion-exchange chelating resins.

An object of the present invention is to provide a procedure for the substantial elimination of the calcium and magnesium ions present in electrolysis saline brines, up to a high degree of purity (in particular, a calcium content below 0.05 mg/l, preferably about 0.02 mg/l) by means of ion-exchange resins with chelating properties used in a simple, conventional apparatus.

In ion-exchange practice, it is well known that if one passes a solution containing monovalent ions (for example, sodium) and divalent ions (for example, calcium), which is the case in electrolytic brines, over an ion-exchange resin in a suitable ionic form and completely free of divalent ions, one obtains at the outlet of the ion-exchange column, the said solution which no longer contains divalent ions. However, in order for this procedure to be technically and economically viable, it is necessary that the ion-exchanger considered should have a sufficiently high useful capacity, which is to say that the real quantity of divalent ions fixed under practical operating conditions must be sufficiently high, when it is in equilibrium with the inflowing solution. If this useful capacity is low, the volume of solution free from calcium ions for example, obtained per exchange cycle, will be reduced and the procedure will not be of technical or economic value. This useful capacity is strongly influenced by various factors such as the exchange kinetics, the theoretical total capacity of the ion-exchange resin, and the concentration of the ions in solution and by the selectivity of the ion-exchanger in relation to the ions to be eliminated.

A recent procedure is known for the removal of calcium and magnesium ions from alkaline electrolysis brines in which it was proposed to use (a) chelating resins of the type having aminoacetic groups grafted onto styrene-butadiene copolymers, styrene-divinylbenzene copolymers or N-glycine-glycidylmethacrylate copolymers, or onto polymers of epichlorohydrin or preferably (b) chelating compounds such as aminoacetic acid derivatives, adsorbed on inert supports such as activated carbon, silica gel, alumina, zeolite or adsorbent synthetic polymers. These chelating compounds adsorbed on an inert support would exhibit the following advantages: greater mechanical strength and chemical stability, lower production cost, and improved performances. Nevertheless, the use of the cited products does not greatly facilitate the reduction of the content of calcium and magnesium ions in the brine to below 10 mg/l.

The chelating resins of the alkylaminophosphonic type are known. Nevertheless, the use of such resins (such as described in French Patent Application No. 74.25610) is disadvantageous due to the fact that they have insufficient mechanical resistance to the osmotic shocks which occur during conversion of the resin to and from the regenerated and saturated forms. The high percentage of broken and cracked beads which thus occurs severely inhibits the economic use of such resins on an industrial scale for the treatment of brines in the chlorine and chlorate industries.

SUMMARY OF THE INVENTION

The present invention comprises a method for the preparation of a chelating resin, wherein the matrix of the resin is formed from beads of a macroporous reticulated vinylaromatic copolymer having a porosity between 700 and 1000 mm$^3$/g and a swelling volume in toluene between 1.65 and 1.90, and this bead matrix is subsequently treated so as to attach thereto alkylaminophosphonic functional groups for ion exchange. This subsequent treatment involves chloromethylation, amination, hydrolysis and alkylphosphonation, and is characterized by using matrix beads in the size range of 0.30–0.50 mm. The chloromethylation is then conducted so as to limit the level of chlorine affixed by the resin to a predetermined value, aminating, then hydrolyzing the chloroaminated copolymer under moderate conditions with dilute acid and at a reduced temperature, followed by alkylphosphonation in a prolonged manner and at a reduced temperature so as to reach an exchange capacity limited to a predetermined value and to avoid secondary cross-linking of the copolymer.

The resin prepared by this method is characterized by an apparent density of 0.35–0.425 g/ml, a bead size smaller than about 0.8 mm, a water retention value of 50–60 percent in the acid form, porosity of 800–1100 mm$^3$/g, and an osmotic resistance such that more than 90 percent of the beads are intact after 30 osmotic shock cycles. This resin has been found to be useful in a process for the purification of concentrated brines, wherein the brine is passed through a bed of beads having the aforedescribed physical properties, and particularly having a maximum total capacity for the fixation of calcium ions of 31 g/l of resin in the sodium form.

DESCRIPTION OF THE INVENTION

The vinylaromatic reticulated copolymers of the type forming the matrix are already known and are used for manufacturing numerous ion-exchange resins. For the present invention, the said matrix is preferably comprised of styrene reticulated with divinylbenzene (DVB), the DVB preferably being employed in an amount of from 5 to 8 percent by weight based upon the total weight of styrene and DVB. It is also possible to use other vinylaromatic compounds such as vinyltoluene or the vinylxylenes, as well as other reticulating agents such as ethyleneglycol dimethacrylate, trimethylol propane, or trivinylbenzene. Mixtures of reticulating agents may also be employed such as a mixture of DVB and from 4 to 9 percent by weight of ethyleneglycol dimethacrylate based on the weight of the mixture, which may preferably be employed in combination with styrene in an amount of from 6 to 12 percent by weight based on the total weight of monomers. The matrix is manufactured in the form of macroporous beads by means of a known suspension polymerization procedure.

In the procedure in accordance with the present invention one obtains resins with high resistance to osmotic shock, because of the selection of an optimal combination of the physical properties of the reticulated vinylaromatic copolymer, notably its granulometry, its porosity, and its swelling volume. Obtention of copolymer beads having the required physical properties can be ensured by the very strict control of the temperature and duration of the suspension polymerization reaction, of the quantity of reticulation agent, and of the nature and quantity of the porogenic agent used.

In the preferred case of a styrene-divinylbenzene matrix, these properties are: porosity between 700 and 1000 mm$^3$/g (which is an apparent density between 0.30 and 0.35), granulometry between 0.30 and 0.50 mm, and a swelling volume in toluene between 1.65 and 1.90.

After having prepared the reticulated vinylaromatic macroporous matrix in accordance with the invention, one introduces the aminophosphonic functional groups, successively effecting the known steps of chloromethylation, amination, hydrolysis, and alkylphosphonation. However, the exchange capacity of the resins thereby obtained is adjusted in accordance with the invention, by the selection of and exact control of the conditions of temperature, duration, and reagent concentrations used for carrying out the said steps.

These operating conditions, which are predetermined in a manner so as to obtain the said combination of advantages (that is, the high resistance to osmotic shock and the adequate capacity), thus comprise the characteristics of the procedure in accordance with the invention.

Thus, the suitable adjustment of the ratio between the organic components and the water during the chloromethylation step makes it possible to limit the level of chlorine fixed in the resin.

Control of the temperature and of the duration of the amination step makes it possible to limit the formation of the aldehyde functional group.

Control of the duration and conditions of the hydrolysis stage makes it possible to control the exchange capacity of the resin obtained and hence its susceptibility to osmotic shock.

Control of the duration and of the temperature of the alkylphosphonation reaction also makes it possible to limit the exchange capacity of the resin obtained, to avoid secondary reticulation of the copolymer, and to thereby avoid a negative influence on the resistance to osmotic shock.

In the particular case of alkylphosphonation of a styrene-divinylbenzene matrix, the chloromethylation may be carried out with a mixture of formaldehyde and methanol, the amination may be carried out with a mixture of methylal and hexamethylene tetramine, the moderate hydrolysis may be carried out with a dilute solution of hydrochloric acid, and the alkylphosphonation may be carried out with a mixture of phosphorous acid and formaldehyde. Other nitrogenous compounds (such as ammonia, amines, aminated salts, amino acids, etc.) or other phosphonation agents (such as phosphites, alkyl- or dialkylphosphites, phosphorus halides, etc.) can, however, be used for the said steps.

The physical characteristics of the resins prepared in accordance with the procedure in conformity with the invention are determined by means of the following methods:

Apparent density: volume/weight ratio of the resin dried at 60° C. for 12 hours.

Granulometry: screening under water of the resin on a series of sieves. The granulometric fractions collected in measurement-cylinders covered with water are packed to constant volume by tapping.

Water retention: this is a measurement of the quantity of water absorbed into the resin when the resin is soaked in deionized water. It is measured by rinsing a weighed sample of desiccated resin in deionized water, removing excess water clinging to the beads but not absorbed in them and re-weighing. The excess water is removed by heating the beads at 100° C. in a buchner funnel covered by a cloth which is kept damp for a period of 14 hours.

Total theoretical capacity for fixation or calcium ions: this measurement is carried out using the following procedure. A sample of resin in the sodium form is rinsed with deionized water and then compacted by tapping in a measuring cylinder. The exact volume is noted. The resin is placed in a column. One liter of a buffered calcium chloride solution is passed through the column over a period of 3 to 4 hours. The composition of this solution is 12.7 g $CaCl_2$+53.5 g $NH_4Cl$+250 ml 20 percent $NH_4OH$ made up to one liter. The pH is 10.

Excess calcium is rinsed from the calcium by passing deionized water through it at the same flow rate. Generally one needs to use 100 vol $H_2O$/vol resin.

The calcium absorbed on the resin is then eluted by passing 230 ml 2N HCl solution through the column over one hour. This is filtrated for calcium using EDTA solution in a known standard manner. The capacity is then the amount of calcium elution divided by the resin volume.

To obtain an equivalent measure of the capacity in terms of the volume of the resin in acid form, one merely measures the volume of the resin sample at the end of the acid elution step and uses that volume instead in the calculations.

Osmotic resistance: optical determination of the percentage of broken and cracked resin beads, after successive cycles of contraction and expansion of the beads as a result of their change in ionic form after passage of solutions of chemical reactants (acid-base) over the resin. One contraction-expansion cycle represents one osmotic shock.

Porosity: determined by the isotherms of nitrogen adsorption and desorption of the resin, B.J.H. method (*Journal of the American Chemical Society,* 73, 373–380, 1951).

Resins prepared according to the described process are particularly well suited for the purification of electrolytic brines. Their high resistance to osmotic shock and specific calcium retention capacity make it possible to easily and economically carry out ion exchange so as to reach final calcium concentrations which are lower than 0.05 mg/l brine, preferably about 0.02 mg/l brine. The preferred characteristics of the resin for this application are:

| | |
|---|---|
| Apparent density | 0.400–0.425 g/ml |
| Granulometry | smaller than 0.8 mm |
| Water retention | 53–55 percent in hydrogen form |
| Osmotic resistance | more than 90 percent of the beads intact after 30 shocks and preferably more than 80 percent of the beads intact after 90 shocks |
| Porosity (B.J.H. method) | 850–950 mm$^3$/g |
| Total calcium capacity | not greater than 31 g/l and preferably not less than 20 g/l, in the sodium form |

The brine purification procedure in accordance with the invention is comprised of the following five steps:
(a) Separation by ion exchange
(b) Displacement
(c) Regeneration
(d) Washing
(e) Conversion to the Na$^+$ form During the separation step (a), the brine to be purified is passed through the resin bed and the calcium and magnesium ions are replaced by sodium ions, until the calcium and magnesium concentrations in the effluent brine have been decreased to the required limits. In general, the total capacity of the resin is not utilized; at the end of operation (a), 15 to 20 percent of the resin bed capacity is still unused.

So as to best utilize the capacity of the resin without allowing the calcium concentration in the effluent to exceed the acceptable level, one can use two or more beds of the said resin in series.

The displacement (b) of the brine from the resin bed is essential only if the brine happens to contain chlorates or other substances which upon contact with hydrochloric acid in the subsequent regeneration step would liberate free chlorine which is chemically deleterious to the resin itself. Recycled brines in particular for instance usually contain chlorates. The displacement can be effected by washing the resin with water or with brine free from chlorates or other chlorine generating substances.

The regeneration (c) can be effected with 2N to 4N hydrochloric acid, so as to eliminate the cations that were complexed by the resin, and to bring it to its acid form. A contact time of the resin with the acid of about 30 minutes is normally sufficient for the complete elimination of the complexed cations; flow rates of 2 to 6 BV/hour are considered to be satisfactory.

Washing (d) of the regenerated resin is preferably effected with deionized water, at a flow rate which allows 50 to 75 percent expansion of the resin bed, with the purpose of eliminating the fine particles and insoluble solids that can be in the resin bed. After the washing, the resin bed is allowed to settle. The washing operation can also be carried out before the regeneration step, but carrying out the washing operation after the regeneration helps to minimize the osmotic shocks to which the resin is subjected.

The conversion (e) to the sodium form can be effected by passing a 2N to 4N solution of sodium hydroxide through the resin bed. The introduction of twice the resin bed volume (2BV) of sodium hydroxide over an approximately 30-minute period is normally sufficient for the resin to be ready to be put back into operation.

The following operating conditions are suitable for better use of the resin in the procedure in accordance with the invention:

1. Use of a chemically-pretreated brine having preferably a calcium concentration lower than 10 mg/l, so as to reduce this concentration to below 0.05 mg/l, preferably to about 0.02 mg/l, in the most effective manner.

2. A brine flow rate of at least 10 BV/hour, e.g., 15–40 BV/hour, is recommended as a compromise between an economic scale for the equipment and the duration of the cycles for the resin used in the realization of the invention.

3. The efficient elimination of the calcium is preferably effected at a pH value for the brine between 8 and 11.

4. Since the useful exchange capacity of the resin increases with the temperature of the brine, it is preferable to carry out the operation cycles with the brine at a temperature of at least 60° C., but not exceeding 80° C.

5. The alkylaminophosphonic resin which is the subject of the present invention, as stated above, is sensitive to the action of chlorine, and it is therefore necessary that the amount of chlorine present in the brine be kept to an absolute minimum. Therefore, any free chlorine which might be present in the raw brine or which would generally be present in brines recirculated for example from the anode compartment of an electrolyzer, must be eliminated before contacting the brine with the resin. The usual means for the removal of free chlorine from the brine is to pass the brine through columns of activated carbon.

6. Accumulation of suspended solids in the resin bed causes pressure drops in the columns and the formation of channels; it is, therefore, desirable that any such suspended solids be removed, e.g., by filtration.

The following examples illustrate various modes of implementing the invention.

EXAMPLE 1

One prepares a copolymer which will comprise the matrix of the resin which is the subject of the invention and which must have specific, predetermined physical properties.

One then grafts onto this matrix the functional groups which make it possible to arrive at the final form of the ion-exchange resin of the alkylaminophosphonic type, by successive operations of chloromethylation, amination, hydrolysis and alkylphosphonation, under specific conditions of temperature, reaction duration and composition.

One prepares DVB-styrene copolymer beads by suspension polymerization. For this purpose, one introduces 400 ml of water into a 1000 ml, three-necked flask, equipped with an agitator, a thermometer, and a reflux refrigerant. One then adds, while stirring, 5 g of calcium chloride, 0.5 g of sodium lignosulfonate, and 0.5 g of hydroxycellulose. After dissolving these suspension agents, one brings the suspension medium thereby obtained to 88° C. and one introduces, with continuous stirring, a mixture consisting of 189 g of styrene, 22.5 g of 61 percent DVB (reticulating agent), 249 g of octoic acid (porogenic agent) and 3 g of benzoyl peroxide (catalyst).

The 61 percent divinylbenzene is thus in a ratio by weight of 6.5 percent in relation to the divinylbenzene-styrene mixture.

The porogenic agent represents 54 percent of the total weight of the monomers and the porogenic agent.

Polymerization is effected by heating, while stirring, this mixture of monomers, porogenic agent, catalyst, and suspension medium for 4 hours, at 88° C. One then cools the mixture to 20° C. and adds, to the flask, aqueous caustic soda (having a concentration of 300 g/l) until obtention of a persistent pH value of 12. One raises the temperature to 88° C. and maintains this temperature for 4 hours. One then cools the mixture and filters the polymerized beads obtained. The beads are washed with water to neutrality and then dried in an oven at 60° C. for 12 hours.

One thereby obtains 200 g of macroporous, reticulated styrene-DVB copolymer beads, having the following characteristics:
Apparent density: 0.325
Swelling in toluene Vs/v: 1.75
Granulometry: between 0.25–1 mm
Porosity: 850 mm³/g For the subsequent operations, these beads are screened so as to obtain a fraction with a granulometry between 0.3 and 0.5 mm.

The characteristics of the copolymer obtained thus correspond to the required characteristics.

One then carries out the chloromethylation of the copolymer thereby obtained by introducing 100 g of copolymer beads into a flask equipped with an agitator, a thermometer, and a reflux refrigerant, containing the chloromethylation solution, comprised of 94 g of formaldehyde, 60 g of methanol, 220 ml of a 97 percent $SO_3HCl$ solution, 15 ml of 40 percent $FeCl_3$ and 60 ml of water.

One heats the mixture to 30° C. and then maintains the mixture at that temperature for 6 hours. Neutralization is then effected with a 4 percent NaOH solution, one filters the chloromethylated copolymer beads, and then washes the beads in water until neutrality. One thereby obtains 370 ml of chloromethylated beads with a chlorine content of 20 percent.

One then carries out amination by introducing the 370 ml of chloromethylated beads into a flask equipped with an agitator, a thermometer, and a reflux refrigerant, containing the amination solution, comprised of 335 ml of 93 percent methylal, 212 g of 99 percent hexamethylenetetramine, and 105 ml of water. The mixture is maintained at 44° C. for 6 hours and is then cooled. The beads are dried and then washed with water until complete disappearance of the traces of amine and methylal. One thereby obtains 775 ml of aminated resin beads.

Hydrolysis is then carried out by introducing the 775 ml of aminated resin beads into a flask equipped with an agitator, a thermometer, and a reflux refrigerant, containing 210 ml of concentrated HCl (32 percent) and 210 ml of water; this mixture is maintained at 45° C. for 4 hours. The mixture is then cooled. The hydrolyzed beads are then dried and washed with water until neutrality. One thereby obtains 580 ml of hydrolyzed beads, with an anionic exchange capacity of 3.9 eq/kg in chloride form.

These beads are then subjected to alkylphosphonation. For this purpose, the 580 ml of beads are introduced into a flask equipped with an agitator, a thermometer, and a reflux refrigerant, containing 267 g of 70 percent phosphorous acid, 69 g of 97 percent formaldehyde, 135 ml of hydrochloric acid concentrated to 32 percent, and 230 ml of water. The mixture is maintained at 90° C. for 3 hours. One thereby obtains 640 ml of the aminoalkylphosphonic chelating resin in accordance with the invention, with the following characteristics:

| | |
|---|---|
| Apparent density | 0.410 g/ml |
| Granulometry | smaller than 0.8 mm |
| Porosity | 900 mm³/g |
| Retention of water | 54 percent in acid form |
| Osmotic resistance | approximately 97 percent of the beads intact after 30 shocks |
| Total calcium capacity | 2.25 eq/l in the acid form; 28.8 g/l in the sodium form |

EXAMPLE 2

An alkylaminophosphonic chelating resin was prepared by the method described in Example 1 but utilizing styrene-divinylbenzene copolymer beads having an apparent density of 0.300, and exhibiting a swelling in toluene factor of 1.75.

The alkylaminophosphonic chelating resin produced had a total theoretical capacity for the fixation of calcium ions of 27 g/l in the sodium form. The osmotic resistance of the resin was determined as 85 percent of the beads intact after 90 shocks.

EXAMPLE 3

An alkylaminophosphonic chelating resin was prepared by the method described in Example 1 but utilizing styrene-divinylbenzene copolymer beads having on apparent density of 0.313 and exhibiting a swelling in toluene factor of 1.69. The alkylaminophosphonic chelating resin so obtained had a total theoretical capacity for the fixation of calcium of 27.5 g/l in the sodium form and the osmotic resistance of the resin was found to be 90 percent of the beads intact after 90 shocks.

EXAMPLE 4

100 g of copolymer beads are prepared and treated in accordance with Example 1, with the exception of the duration and the temperature of the alkylphosphonation step, which in this case are, respectively, 3 hours and 103° C.

One thereby obtains 660 ml of chelating resin having a capacity expressed in calcium/l of 2.7 eq/l in the acid form and 34.55 g/l in the sodium form and an osmotic resistance corresponding to 35 percent of the beads intact after 30 shocks.

It was seen that the variations in the duration and the temperature of alkylphosphonation led to an increase in the capacity of the beads and a strong decrease in their osmotic resistance, as compared to the beads obtained in Example 1.

EXAMPLE 5

The procedure of Example 1 is followed, with the exception that the hydrolysis step is carried out at 45° C. for 12 hours. One obtains a chelating resin having a capacity measured in calcium/l of 2.48 eq/l in the acid form and of 31.75 g/l in the sodium form and an osmotic resistance of 50 percent of the beads intact after 30 shocks, thus lower in relation to the resin obtained in accordance with Example 1.

EXAMPLE 6

In this example, one demonstrates the influence of the characteristics of the macroreticulated styrene copolymer comprising the matrix.

In this case, one begins with a macroreticulated styrene copolymer with an apparent density of 0.360, a porosity of 1060 mm$^3$/g and a swelling volume of 1.9. One then carries out all of the steps required for the fixing of the alkylaminophosphonic groups as described in Example 1.

One obtains in this case a chelating resin with a capacity in calcium/l of 2.36 eq/l in the acid form and of 30.20 g/l in the sodium form, comparable to that of the resin obtained in accordance with Example 1.

The osmotic resistance of the resin obtained in this case however is 50 percent of the beads intact after 30 shocks, thus lower than the corresponding value for the resin in accordance with Example 1.

EXAMPLE 7

One begins in this example with the copolymer in accordance with Example 6; one carries out all of the steps required for the fixation of the alkylaminophosphonic groups in accordance with Example 1, with the exception of the alkylphosphonation step, which is carried out in this case for 3 hours at 103° C.

One thereby obtains a chelating resin having a capacity in calcium/l of 2.5 eq/l in the acid form and of 32.0 g/l in the sodium form and an osmotic resistance of 10 percent of the beads intact after 30 shocks. Thus, the osmotic resistance of the beads in this case is 80 percent lower than the value obtained for the beads in accordance with Example 1.

The limitation of the exchange capacity value, provided for in accordance with the invention, will essentially depend on the use for which the resin is intended. This limit value of the capacity can be determined empirically as a function of the ions to be fixed in each case, in a manner so as to simultaneously ensure a high osmotic resistance and an adequate exchange capacity.

The alkylaminophosphonic macroporous chelating resin in accordance with the present invention has excellent mechanical stability and strength, good chemical stability, and acceptable ion-exchange capacities and ion-exchange rates.

The resin also has a specific series of selectivity for metallic cations which makes it particularly suitable for ion exchange in highly concentrated solutions, and for the extremely efficient and economical separation or purification of certain bivalent cations of heavy metals or alkali metals. The following examples illustrate use of the resin in a specific application, the purification of concentrated brines.

EXAMPLE 8

An installation is used which includes two steel columns lined with rubber, each column having a useful volume of 150 liters.

The first column is filled with activated carbon and is used as a filter; the second column, which is used as an exchange column, is filled with the resin which is the subject of the present invention. The exchange column is fed with an industrial brine used for electrolysis, in a diaphragm cell in which the concentration is in the range of 2 to 5 mg/l of calcium and 0.15 to 0.20 mg/l of magnesium, and the flow rate of which is in the range of 1.2 to 1.6 m$^3$/hour. The time period between the regenerations is longer than 15 days.

No deterioration in the resin could be detected after 8 months of operation. The current outputs did not decrease in a noticeable manner during this period in the cell operating with the purified brine and the percentages of chlorine and oxygen remained almost constant during this period. In contrast, other cells, which were operating with an unpurified brine, exhibited decreases in the current output of 5 to 10 percent. Thus, there was a clear improvement in the performance of the diaphragm cell which used the procedure in accordance with the invention.

EXAMPLE 9

The purpose is to decrease to below 0.05 mg/l, preferably to about 0.02 mg/l, the concentration of calcium in the industrial concentrated brines used for electrolysis in membrane cells.

An installation was used which was comprised of three columns operating in series; each column had a capacity of 0.85 m$^3$.

After filling with the resin in accordance with the invention, the columns were fed with an industrial brine containing 3 to 4 mg/l of calcium and having a temperature of 60° C., a pH value of 9 to 10, and a flow rate of 5 to 6 volumes/hour.

The brine was dechlorinated before entry into the first column.

The head column was taken out of service and regenerated when the effluent brine reached a calcium concentration of 0.5 mg/l. The final calcium concentration of the purified brine was about 0.02 mg/l and the final magnesium concentration was lower than 0.005 mg/l.

It should also be noted that one can vary the flow rate of the brine through the resin bed and still achieve acceptable results. Because of the capacity and the high kinetics of the resin, it was possible to maintain a calcium concentration lower than 0.05 mg/l in the effluent, while increasing the flow rate up to 40 volumes of brine per volume of resin and per hour.

EXAMPLE 10

The superior useful capacity for the fixation of calcium ions of a resin according to the present invention as compared with a known resin of useful osmotic resistance (a styrene-divinylbenzene copolymer grafted with iminodiaceticacid groups) is illustrated by this example.

An electrolytic brine used in the chlorine production industry was contacted with a bed of resin under test and the capacity of the resin to absorb calcium was measured. The resin was considered to be exhausted when it failed to reduce the calcium concentration in the effluent to 1 mg/l $Ca^{2+}$ or below. The measurement is expressed both in terms of the weight of calcium absorbed and the volume of brine treated.

The table below shows the test conditions and the results obtained.

with first 3 bed volumes of 2N HCl solution, then 3 bed volumes of deionized water, then 3 bed volumes of 2N NaOH solution and finally, 10 bed volumes of deionized water. After the bed had treated 11,000 bed volumes of brine, the loss of total theoretical capacity for the fixation of calcium ions was found to be only 8.5 percent leaving the capacity at 27 g/l of resin in the sodium form.

Throughout the test, the total hardness $(Ca^{2+}+Mg^{2+})$ of the effluent brine was below 0.1 mg/l.

INDUSTRIAL APPLICATIONS

The procedure in accordance with this invention can be used for the efficient and economic elimination of calcium and magnesium ions from concentrated brine solutions feeding electrolysis cells for the production of chlorine or of alkali metals and, especially, membrane cells.

Application of this purification procedure makes it possible to greatly increase the life-span of the electrolytic membranes and the current output of electrolysis cells.

The effectiveness and ease of implementation of the procedure also makes it of value from an economic point of view for the purification treatment of brines for diaphragm cells and for electrolytic chlorate production.

What is claimed is:

1. A process for the production of an alkylaminophosphonic chelating resin which process comprises:
   (a) selecting beads of a macroporous reticulated vinylaromatic copolymer which beads have a porosity from 700 mm³/g to 1000 mm³/g, a volume of swelling in toluene factor of from 1.65 to 1.9, and a

| Resin Type | Influent Brine Test conditions | | | | Useful Ca++ Capacity Resin Na+ Form | | Volume of Brine Treated Per Volume of Resin |
|---|---|---|---|---|---|---|---|
| | T °C. | Bed Vol/Hr. | Da²+ mg/l | pH | Ca²+ (g/l resin) | Ca²+ (eq/l resin) | |
| Imino- | 20 | 10 | 15.8 | 9.5 | 7.0 | 0.35 | 460 |
| diacetic Resin | | 20 | 15.8 | 9.5 | 6.8 | 0.34 | 400 |
| (Amberlite | 60 | 10 | 15.8 | 9.5 | 7.2 | 0.36 | 580 |
| XE 318) | | 20 | 15.8 | 9.5 | 7.1 | 0.355 | 520 |
| Alkylamino- | 20 | 10 | 15.5 | 9.8 | 12.6 | 0.63 | 830 |
| phosphonic | | 20 | 15.5 | 9.8 | 12.4 | 0.62 | 760 |
| Resin | 60 | 10 | 15.5 | 9.8 | 15.8 | 0.80 | 1,180 |
| of Example 1 | | 20 | 15.5 | 9.8 | 15.6 | 0.79 | 1,100 |

EXAMPLE 11

This example shows the ability of a resin according to the invention to remove calcium from a solution used in the electrolytic production of chlorate. An electrolytic brine treated had a pH of 6.1 and the following composition:

| | |
|---|---|
| NaClO₃ | 500 g/l |
| NaCl | 150 g/l |
| Na₂Cr₂O₇ | 5 g/l |
| Ca²+ | 100 mg/l |
| Mg²+ | 30 mg/l |

The brine was treated with sodium hydroxide to raise the pH to 10.5 and passed through a bed of a resin prepared in accordance with Example 1. The temperature of the brine was 40° C. and the brine flow rate was 15 bed volumes per hour. The bed was periodically regenerated by removal of chlorate followed by treatment size in the range of 0.3 to 0.5 mm.
   (b) (i) chloromethylating the copolymer beads to introduce a desired level of chlorine,
   (ii) aminating the chlorinated beads to form chloraminated beads,
   (iii) hydrolyzing the chloraminated beads under moderate conditions with dilute acid, and
   (iv) alkylphosphonating the hydrolyzed beads in such a manner as does not produce secondary cross-linking the copolymer,
   (c) the said chloromethylation, amination, hydrolysis and alkylphosphonation being carried out under such conditions and for a duration such that the alkylaminophosphonic chelating resin thereby produced has an apparent density of 0.35 to 0.425 g/ml, a granulometry smaller than 0.8 mm, a water retention of 50 to 60 percent in the acid form, a porosity of 800 to 1100 mm³/g, a total theoretical capacity for the fixation of calcium ions of not greater than 31 g/l of resin in the sodium form and an osmotic resistance such that more than 90 percent of the beads are intact after 30 shocks.

2. A process as claimed in claim 1 wherein the said chloromethylation, amination, hydrolysis and alkylphosphonation is carried out under such conditions and for a duration such that the alkylaminophosphonic chelating resin thereby produced has an apparent density of 0.4 to 0.425 g/ml, a water retention of 53 to 55 percent in the acid form, and a porosity of from 850 to 950 mm$^3$/g.

3. A process as claimed in claim 1 wherein the level of chlorine fixed in step b (i) is limited to 16 to 22 percent by weight of the chloromethylated copolymer.

4. A process as claimed in claim 1 wherein the amination is carried out with a mixture of water, hexamethylenetetramine and methylal containing 1.0 to 2.5 moles of hexamethylenetetramine per mole of monomer used to prepare the copolymer.

5. A process as claimed in claim 4 wherein the amination is conducted at about 44° C. for a period of 4 to 6 hours, and the aminating mixture contains 1.5 to 2.0 moles of hexamethylenetetramine per mole of monomer used to prepare the copolymer.

6. A process as claimed in claim 1 wherein the hydrolysis is carried out with 15 to 20 percent hydrochloric acid at a temperature of 40° to 60° C.

7. A process as claimed in claim 1 wherein the alkylphosphonation is carried out at a temperature of 80° to 90° C. for a period of 3 to 7 hours.

8. A process as claimed in claim 1 wherein the copolymer beads selected have a porosity in the range of 800 to 900 mm$^3$/g, and a volume of swelling in toluene factor in the range of 1.70 to 1.80.

9. A process as claimed in claim 1 further comprising the initial step of forming the beads of macroporous reticulated vinylaromatic copolymer by suspension polymerization of a vinylaromatic compound with a reticulating agent.

10. A process as claimed in claim 9 wherein the reticulating agent is selected from divinylbenzene, ethyleneglycol dimethacrylate, trimethylolpropane, trivinylbenzene or a mixture of two or more thereof and the vinylaromatic compound is selected from styrene, vinyltoluene, a vinylxylene, or a mixture of two or more thereof.

11. A process as claimed in claim 9 wherein the reticulating agent is present as from 6 to 12 percent by weight of the monomer for the suspension polymerization and the reticulating agent is a mixture of divinylbenzene and ethyleneglycol dimethacrylate of which mixture ethyleneglycol dimethacrylate comprises from 4 to 9 percent by weight.

12. A process as claimed in claim 9 wherein the copolymer beads are obtained by suspension polymerization of a mixture of styrene and divinylbenzene, with the divinylbenzene comprising 5 to 8 percent by weight of the mixture.

13. A process as claimed in claim 9 wherein the copolymer beads are obtained by suspension polymerization in the presence of a porogenic agent comprising 40 to 60 percent of the total weight of the monomers and the porogenic agent.

14. A process as claimed in claim 13 wherein the porogenic agent is octoic acid.

15. An alkylaminophosphonic chelating resin produced by the process of claim 1.

16. A process for the removal of polyvalent cation impurities from a solution containing predominantly monovalent cations which process comprises contacting the solution with the resin prepared according to claim 1.

17. A process as claimed in claim 16 wherein the concentration of ionic species in the solution to be purified is above 3 molar.

18. A process for the purification of concentrated brines for electrolysis, comprising contacting the brine with beads of a chelating resin prepared by the process of claim 1 and recovering the purified brine.

19. A process as claimed in claim 18 wherein the purification is conducted in the temperature range of 50° to 90° C.

20. A process as claimed in claim 19 wherein the temperature of the brine being purified is about 60° C.

21. A process as claimed in claim 18 wherein the calcium content of the purified brine is maintained lower than 0.05 mg/l by periodically regenerating the resin by contacting it with a volume of hydrochloric acid providing about 2 to 6 equivalents of acid per liter of the resin.

22. A process as claimed in claim 21 wherein the resin is converted from the acid form to the sodium form by contacting the regenerated resin with a volume of NaOH solution providing from 2 to 6 equivalents of NaOH per liter of the resin.

23. A process as claimed claim 18 wherein the brine purification is carried out at a rate of up to 40 volumes of brine per volume of resin per hour, to maintain a calcium content of less than 0.05 mg/l in the purified brine.

24. A process for the production of an alkylaminophosphonic chelating resin which process comprises:
(a) Selecting beads of a macroporous reticulated vinylaromatic copolymer which beads have a porosity from 700 mm$^3$/g to 1000 mm$^3$/g, a volume of swelling in toluene factor of from 1.65 to 1.9, and a size in the range of 0.3 to 0.5 mm;
(b) (i) chloromethylating the copolymer beads to introduce from 16 to 22 percent chlorine by weight of the chloromethylated copolymer;
(ii) aminating the chloromethylated beads at about 44° C. for a period of 4 to 6 hours with a mixture water, hexamethylenetetramine and methylal containing 1.5 to 2.0 moles of hexamethylenetetramine per mole of monomer used to prepare the copolymer, to to form chloroaminated beads;
(iii) hydrolyzing the chloroaminated beads with 15 to 20 percent hydrochloric acid at a temperature of 40° to 60° C., and
(iv) alkylphosphonating the hydrolyzed beads at a temperature of 80° to 90° C. for a period of 3 to 7 hours,
(c) the said chloromethylation, amination, hydrolysis and alkylphosphonation being carried out under such conditions and for a duration such that the alkylaminophosphonic chelating resin thereby produced has an apparent density of 0.35 to 0.425 g/ml, a granulometry smaller than 0.8 mm, a water retention of 50 to 60 percent in the acid form, a porosity of 800 to 1100 mm$^3$/g, a total theoretical capacity for the fixation of calcium ions of not greater than 31 g/l of resin in the sodium form and an osmotic resistance such that more than 90 percent of the beads are intact after 30 shocks.

* * * * *

UNITED STATES PATENT AND TRADEMARK OFFICE
CERTIFICATE OF CORRECTION

PATENT NO. : 4,818,773

DATED : April 4, 1989

INVENTOR(S) : Michel A. G. Cornette et al.

It is certified that error appears in the above-identified patent and that said Letters Patent is hereby corrected as shown below:

Column 11, line 38 of Table reads -- $Da^{2+}$ mg/l --

It should read -- $Ca^{2+}$ mg/l --.

Signed and Sealed this

Twenty-third Day of April, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO.: 4,818,773

DATED: April, 4, 1989

INVENTOR(S): CORNETTE, ET AL.

It is certified that error appears in the above-identified patent and that said Letters Patent is hereby corrected as shown below:

The Applicants' claim for priority under 35 U.S.C. §119 should appear on the face of the patent as follows:

-- [30] Foreign Application Priority Data

Feb. 25, 1982    France    82/03114
    Feb. 25, 1982    France    82/03115 -- .

Signed and Sealed this

Twenty-seventh Day of April, 1993

Attest:

MICHAEL K. KIRK

*Attesting Officer*      *Acting Commissioner of Patents and Trademarks*